US012700354B2

(12) United States Patent
Park et al.

(10) Patent No.: US 12,700,354 B2
(45) Date of Patent: Aug. 4, 2026

(54) DISPLAY DEVICE AND ELECTRONIC DEVICE INCLUDING THE SAME

(71) Applicant: SAMSUNG DISPLAY CO., LTD., Yongin-si (KR)

(72) Inventors: Junhyun Park, Yongin-si (KR); Cheol-Gon Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/267,117

(22) Filed: Jul. 11, 2025

(65) Prior Publication Data

US 2026/0094560 A1 Apr. 2, 2026

(30) Foreign Application Priority Data

Sep. 27, 2024 (KR) ........................ 10-2024-0131291

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01); *G09G 2310/0267* (2013.01); *G09G 2310/0275* (2013.01); *G09G 2310/08* (2013.01); *G09G 2320/0233* (2013.01)

(58) Field of Classification Search
CPC ..... G09G 2300/043; G09G 2310/0267; G09G 2310/0275; G09G 2310/08; G09G 2320/0233; G09G 3/32; G09G 2300/0819
See application file for complete search history.

(56) References Cited

U.S. PATENT DOCUMENTS

| | | | | | |
|---|---|---|---|---|---|
| 11,222,604 | B2 * | 1/2022 | Lee | G09G 3/3291 |
| 2012/0169798 | A1 * | 7/2012 | Ebisuno | G09G 3/325 345/77 |
| 2018/0268760 | A1 * | 9/2018 | Chen | G09G 3/3266 |
| 2020/0380920 | A1 * | 12/2020 | Lee | G09G 3/3291 |
| 2021/0210014 | A1 * | 7/2021 | Kim | G09G 3/2007 |
| 2025/0252903 | A1 * | 8/2025 | Chun | G09G 3/32 |

FOREIGN PATENT DOCUMENTS

CN 116665570 A * 8/2023 ........... G09G 3/3266

OTHER PUBLICATIONS

CN-116665570-A; Aug. 29, 2023; Yin, Hai-jing (English Translation).*

* cited by examiner

*Primary Examiner* — Ricardo Osorio
(74) *Attorney, Agent, or Firm* — F. CHAU & ASSOCIATES, LLC

(57) ABSTRACT

A display device includes a display panel including a pixel including a light emitting element, and a first transistor configured to generate a driving current based on a first power supply voltage and a second power supply voltage and to provide the driving current to the light emitting element, a gate driver configured to provide a gate signal to the pixel, a data driver configured to provide a data voltage to the pixel, and a driving controller configured to controls the gate driver and the data driver. The first transistor includes a back gate electrode receiving a bias voltage. The bias voltage is a fixed bias voltage during an address scan period and a variable bias voltage during a self-scan period after the address scan period.

20 Claims, 11 Drawing Sheets

DISPLAY DEVICE AND ELECTRONIC DEVICE INCLUDING THE SAME

CROSS-REFERENCE TO RELATED APPLICATION(S)

This U.S. patent application claims priority under 35 USC § 119 to Korean Patent Application No. 10-2024-0131291 filed on Sep. 27, 2024 in the Korean Intellectual Property Office (KIPO), the entire disclosure of which is incorporated by reference in its entirety herein.

1. TECHNICAL FIELD

Embodiments of the present inventive concept are directed to a display device and an electronic device including the same.

2. DISCUSSION OF RELATED ART

In general, a display device includes a display panel and a display panel driver. The display panel includes gate lines, data lines, emission lines, and pixels. The display panel driver includes a gate driver for providing a gate signal to the gate lines, a data driver for providing a data voltage to the data lines, an emission driver for providing an emission signal to the emission lines, and a driving controller for controlling the gate driver, the data driver, and the emission driver.

The driving frequency of the display device refers to how frequently signals are applied to drive the pixels of the display panel. The display device may support a variable driving frequency. As the driving frequency of the display panel increases, the driving time of a driving transistor in each pixel may also increase, potentially causing changes in a threshold voltage or hysteresis characteristic of the driving transistor. In this case, a display quality of the display device may decrease.

SUMMARY

Embodiments of the present inventive concept provide a display device for applying a bias voltage to a driving transistor to enhance display quality and an electronic device including the display device.

In an embodiment of a display device according to the present inventive concept, the display device includes a display panel including a pixel including a light emitting element, and a first transistor configured to generate a driving current based on a first power supply voltage and a second power supply voltage and to provide the driving current to the light emitting element, a gate driver configured to provide a gate signal to the pixel, a data driver configured to provide a data voltage to the pixel, and a driving controller configured to controls the gate driver and the data driver. The first transistor includes a back gate electrode receiving a bias voltage. The bias voltage is a fixed bias voltage during an address scan period and a variable bias voltage during a self-scan period after the address scan period.

In an embodiment, the first transistor may be a PMOS transistor.

In an embodiment, the fixed bias voltage may be the first power supply voltage.

In an embodiment, the variable bias voltage may have a value between a voltage lower by a setting voltage from the fixed bias voltage and a voltage higher by the setting voltage from the fixed bias voltage. For example, the variable bias voltage is within a range defined by the fixed bias voltage plus or minus the setting voltage.

In an embodiment, the variable bias voltage may vary based on a threshold voltage or a hysteresis characteristic of the first transistor.

In an embodiment, in the address scan period and a first self-scan period after the address scan period, the data voltage may be provided to the pixel, and in a second self-scan period after the first self-scan period, the data voltage may not be provided to the pixel.

In an embodiment, when the bias voltage is the fixed bias voltage in the address scan period and the first self-scan period, and the bias voltage is the variable bias voltage in the second self-scan period, the variable bias voltage may be a global signal simultaneously provided to pixel rows of the display panel.

In an embodiment, when the bias voltage is the fixed bias voltage in the address scan period and the bias voltage is the variable bias voltage in the first self-scan period and the second self-scan period, the variable bias voltage may be a sequential signal which is sequentially provided to the pixel rows.

In an embodiment, when the variable bias voltage is the sequential signal, the display device may further include a signal generator including a plurality of stages. Each of the stages may include a first switching element including a gate electrode receiving a first clock signal, a first electrode receiving an input signal, and a second electrode connected to a first control node, a second switching element including a gate electrode receiving a low gate voltage, a first electrode connected to a second control node, and a second electrode connected to a third control node, a third switching element including a gate electrode connected to the third control node, a first electrode receiving the low gate voltage, and a second electrode connected to an inversion control node, a fourth switching element including a gate electrode connected to the second control node, a first electrode receiving a high gate voltage, and a second electrode connected to the inversion control node, a fifth switching element including a gate electrode connected to the third control node, a first electrode receiving the variable bias voltage, and a second electrode connected to a bias output node from which the bias voltage is output, a sixth switching element including a gate electrode connected to the inversion control node, a first electrode receiving the fixed bias voltage, and a second electrode connected to the bias output node, a seventh switching element including a gate electrode connected to the third control node, a first electrode receiving the high gate voltage, and a second electrode connected to a carry output node from which a carry signal is output, an eighth switching element including a gate electrode connected to the inversion control node, a first electrode receiving the high gate voltage, and a second electrode connected to the carry output node, and a first capacitor including a first electrode connected to the third control node and a second electrode connected to the bias output node.

In an embodiment, each of the stages may further include a ninth switching element including a gate electrode receiving the high gate voltage, a first electrode connected to the first control node, and a second electrode connected to the second control node.

In an embodiment, the first switching element, the second switching element, the fourth switching element, the fifth switching element, the sixth switching element, the seventh switching element, and the eighth switching element may be PMOS transistors, and the third switching element and the ninth switching element may be NMOS transistors.

In an embodiment, each of the stages may further include a second capacitor including a first electrode receiving the high gate voltage and a second electrode connected to the inversion control node.

In an embodiment, the first transistor may include a gate electrode connected to a first node, a first electrode connected to a second node, a second electrode connected to a third node, and the back gate electrode receiving the bias voltage. The light emitting element may include an anode connected to a fourth node and a cathode receiving the second power supply voltage. The pixel may further include a second transistor including a gate electrode receiving a data write gate signal, a first electrode connected to a data line transmitting the data voltage, and a second electrode connected to the second node, a third transistor including a gate electrode receiving a compensation gate signal, a first electrode connected to the first node, and a second electrode connected to the third node, and a fourth transistor including a gate electrode receiving an initialization gate signal, a first electrode receiving an initialization voltage, and a second electrode connected to the first node.

In an embodiment, the pixel may further include a fifth transistor including a gate electrode receiving an emission signal, a first electrode receiving the first power supply voltage, and a second electrode connected to the second node, and a sixth transistor including a gate electrode receiving the emission signal, a first electrode connected to the third node, and a second electrode connected to a fourth node.

In an embodiment, the pixel may further include a seventh transistor including a gate electrode receiving an anode initialization gate signal, a first electrode receiving an anode initialization voltage, and a second electrode connected to the fourth node.

In an embodiment, the first transistor may include a gate electrode connected to a first node, a first electrode receiving the first power supply voltage, a second electrode connected to a second node, and the back gate electrode receiving the bias voltage, and the light emitting element may include an anode connected to a fourth node and a cathode receiving the second power supply voltage. The pixel may further include a second transistor including a gate electrode receiving a data write gate signal, a first electrode connected to a data line transmitting the data voltage, and a second electrode connected to a third node, a third transistor including a gate electrode receiving a compensation gate signal, a first electrode connected to the first node, and a second electrode connected to the second node, and a fourth transistor including a gate electrode receiving an initialization gate signal, a first electrode receiving an initialization voltage, and a second electrode connected to the third node.

In an embodiment, the pixel may further include the variable bias voltage is within a range defined by the fixed bias voltage plus or minus a setting a fifth transistor including a gate electrode receiving the compensation gate signal, a first electrode receiving the first power supply voltage, and a second electrode connected to the third node, and a sixth transistor including a gate electrode receiving an emission signal, a first electrode connected to the second node, and a second electrode connected to a fourth node.

In an embodiment, the pixel may further include a seventh transistor including a gate electrode receiving an anode initialization gate signal, a first electrode receiving an anode initialization voltage, and a second electrode connected to the fourth node.

In an embodiment of an electronic device according to the present inventive concept, the display device includes a display panel including a pixel including a light emitting element, and a first transistor configured to generate a driving current based on a first power supply voltage and a second power supply voltage and to provide the driving current to the light emitting element, a gate driver configured to provide a gate signal to the pixel, a data driver configured to provide a data voltage to the pixel, a driving controller configured to controls the gate driver and the data driver, and a processor configured to control the driving controller. The first transistor includes a back gate electrode receiving a bias voltage. In an address scan period, the bias voltage is a fixed bias voltage during an address scan period and a variable bias voltage during a self-scan period after the address scan period.

In an embodiment of the present inventive concept, a controller is provided that includes a gate driver, a driving controller and a signal generator. The driving controller is configured to determine a fixed bias voltage, determine a variable bias voltage, and control the gate driver to provide gate signals to gate lines of the display panel and a scan driving signal. The signal generator is configured to apply the fixed bias voltage to the back gate electrode during an address scan period and apply the variable bias voltage to the back gate electrode during a self-scan period following the address scan period, in synchronization with the scan driving signal.

According to the pixel, the display device and the electronic device, the bias voltage may be applied to the back gate electrode of the driving transistor. The bias voltage may be constant during the address scan period and may be variable during the self-scan period following the address scan period. Accordingly, the threshold voltage or the hysteresis characteristic of the driving transistor may be improved.

BRIEF DESCRIPTION OF THE DRAWINGS

The above and other features of embodiments of the present inventive concept will become more apparent by describing in detailed embodiments thereof with reference to the accompanying drawings, in which.

DETAILED DESCRIPTION

Hereinafter, the present inventive concept will be described in more detail with reference to the accompanying drawings.

The inventive concept relates to a display device and an electronic device including the same that enhances display quality by dynamically adjusting the bias voltage applied to the back gate of a driving transistor in each pixel. A display panel of the display device is operated with variable refresh rates and includes periods for writing data (e.g., address scan period) and for light emission without new data input (e.g., a self-scan period). During the address scan period, a fixed bias voltage is applied to the back gate of the driving transistor. During the self-scan period, however, a variable bias voltage is applied, which can be adjusted based on characteristics such as the threshold voltage or hysteresis behavior of the transistor. This dynamic biasing approach helps stabilize the performance of the transistor over time, compensates for variations due to extended operation, and maintains consistent image quality even under changing display frequencies.

Figure 1:
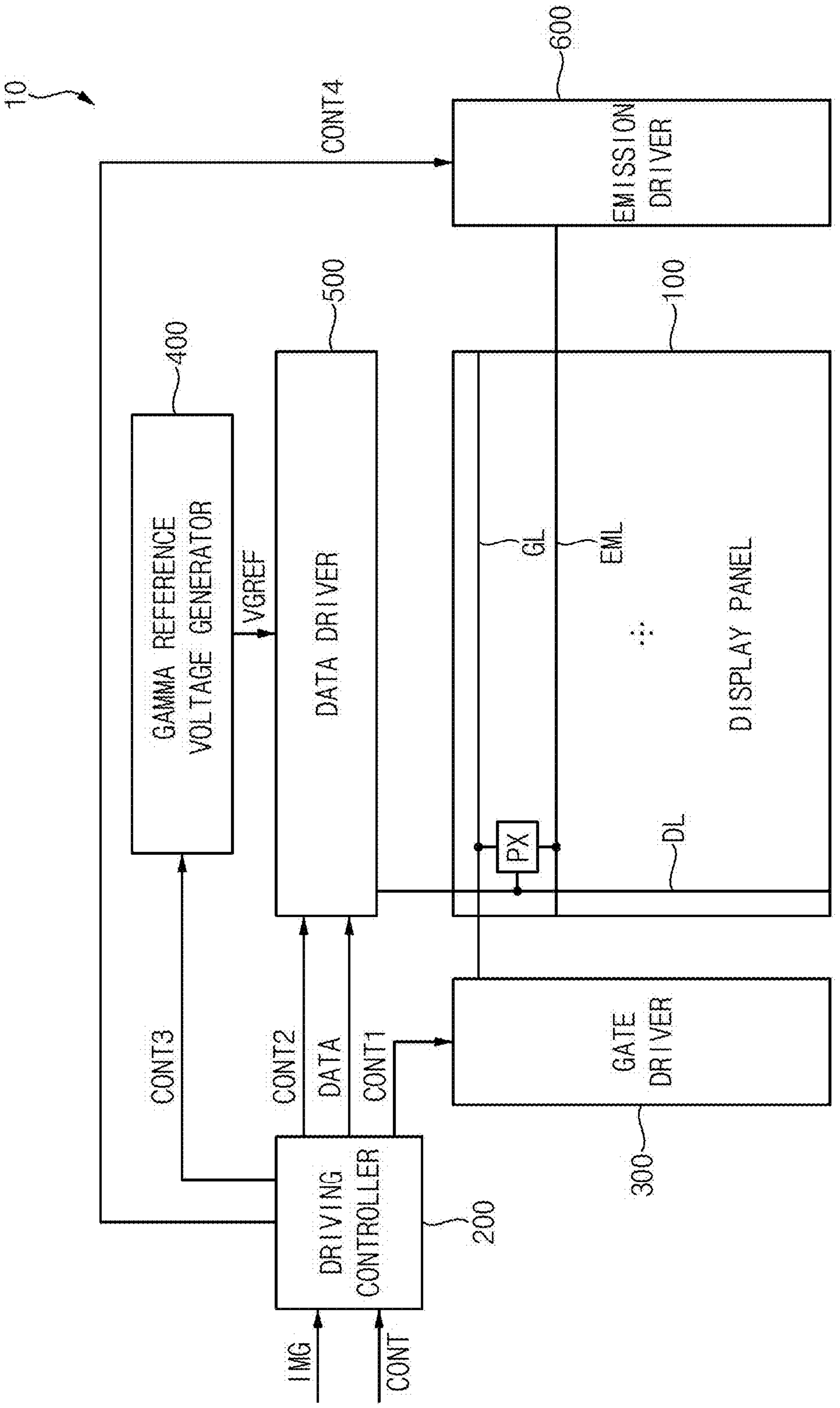
FIG. 1 is a block diagram showing a display device according to embodiments of the present inventive concept.

FIG. 1 is a block diagram showing a display device according to embodiments of the present inventive concept.

Referring to FIG. 1, a display device 10 may include a display panel 100 and a display panel driver. The display panel driver may include a driving controller 200 (e.g., a controller circuit), a gate driver 300 (e.g., a first driver circuit), a gamma reference voltage generator 400, a data driver 500 (e.g., a second driver circuit), and an emission driver 600 (e.g., a third driver circuit).

The display panel 100 may include a display area for displaying an image and a peripheral area disposed adjacent to the display area.

The display panel 100 may include gate lines GL, data lines DL, emission lines EML, and pixels PX electrically connected to the gate lines GL, the data lines DL, and the emission lines EML, respectively. The gate lines GL may extend in a first direction, the data lines DL may extend in a second direction crossing the first direction, and the emission lines EML may extend in the first direction.

The driving controller 200 may receive input image data IMG and an input control signal CONT from an external device. For example, the input image data IMG may include red image data, green image data and blue image data. The input image data IMG may include white image data. The input image data IMG may include magenta image data, yellow image data, and cyan image data. The input control signal CONT may include a master clock signal and a data enable signal. The input control signal CONT may further include a vertical synchronization signal and a horizontal synchronization signal.

The driving controller 200 may generate a first control signal CONT1, a second control signal CONT2, a third control signal CONT3, a fourth control signal CONT4, and a data signal DATA based on the input image data IMG and the input control signal CONT.

The driving controller 200 may generate the first control signal CONT1 for controlling an operation of the gate driver 300 based on the input control signal CONT, and output the first control signal CONT1 to the gate driver 300. The first control signal CONT1 may include a vertical start signal and a gate clock signal.

The driving controller 200 may generate the second control signal CONT2 for controlling an operation of the data driver 500 based on the input control signal CONT, and output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate the third control signal CONT3 for controlling an operation of the gamma reference voltage generator 400 based on the input control signal CONT, and output the third control signal CONT3 to the gamma reference voltage generator 400.

The driving controller 200 may generate the fourth control signal CONT4 for controlling an operation of the emission driver 600 based on the input control signal CONT, and output the fourth control signal CONT4 to the emission driver 600.

The gate driver 300 may generate gate signals for driving the gate lines GL in response to the first control signal CONT1 received from the driving controller 200. The gate driver 300 may output the gate signals to the gate lines GL.

The gamma reference voltage generator 400 may generate a gamma reference voltage VGREF in response to the third control signal CONT3 received from the driving controller 200. The gamma reference voltage generator 400 may provide the gamma reference voltage VGREF to the data driver 500. The gamma reference voltage VGREF may have a value corresponding to each data signal DATA.

For example, the gamma reference voltage generator 400 may be disposed within the driving controller 200 or may be disposed within the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into a data voltage having an analog type using the gamma reference voltage VGREF. The data driver 500 may output the data voltage to the data line DL.

The emission driver 600 may generate emission signals for driving the emission lines EML in response to the fourth control signal CONT4 received from the driving controller 200. The emission driver 600 may output the emission signals to the emission lines EML.

In FIG. 1, for a convenience of an explanation, the gate driver 300 may be disposed on a first side of the display panel 100 and the emission driver 600 may be disposed on a second side of the display panel 100. Although shown, the present inventive concept is not limited thereto. For example, both the gate driver 300 and the emission driver 600 may be disposed on the first side of the display panel 100. For example, both the gate driver 300 and the emission driver 600 may be disposed on both sides of the display panel 100. For example, the gate driver 300 and the emission driver 600 may be formed integrally.

Figure 2:
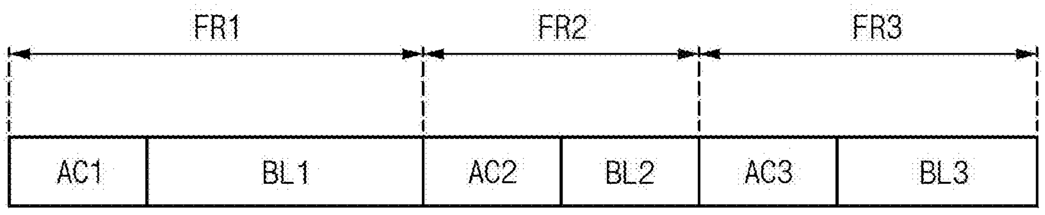
FIG. 2 is a conceptual diagram showing a driving frequency of a display panel of FIG. 1.

FIG. 2 is a conceptual diagram showing a driving frequency of a display panel 100 of FIG. 1.

Referring to FIG. 1 and FIG. 2, a display panel 100 may be driven at a variable frequency. A first frame period FR1 having a first frequency may include a first active period AC1 and a first blank period BL1. A second frame period FR2 having a second frequency different from the first frequency may include a second active period AC2 and a second blank period BL2. A third frame period FR3 having a third frequency different from the first frequency and the second frequency may include a third active period AC3 and a third blank period BL3.

The first active period AC1 may have the same length as the second active period AC2, and the first blank period BL1 may have a different length from the second blank period BL2.

The second active period AC2 may have the same length as the third active period AC3, and the second blank period BL2 may have a different length from the third blank period BL3.

A display device 10 supporting the variable driving frequency may include an address scan period in which a data voltage VDATA is applied to a pixel PX and a self-scan period in which the data voltage is not written to the pixel PX (e.g., only performs light emission). The address scan period may be arranged within the active periods AC1, AC2, AC3. The self-scan period may be arranged within the blank periods BL1, BL2, BL3.

Figure 3:
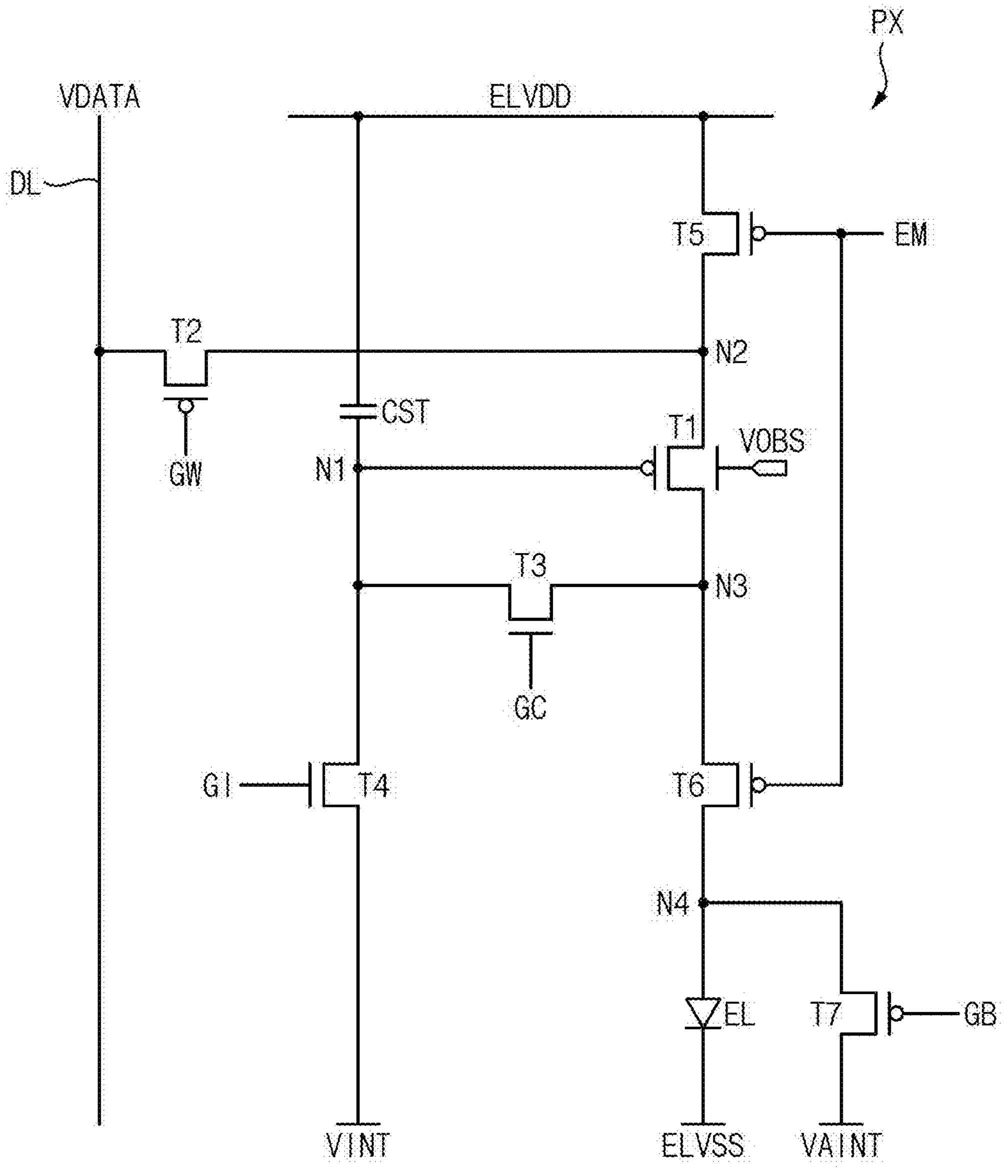
FIG. 3 is a circuit diagram showing an example of a pixel of FIG. 1.

FIG. 3 is a circuit diagram showing an example of a pixel PX of the display panel 100 of FIG. 1.

Referring to FIG. 3, a pixel PX may include first to seventh transistors T1 to T7, a storage capacitor CST, and a light emitting element EL. In an embodiment, the first transistor T1, the second transistor T2, the fifth transistor T5, the sixth transistor T6, and the seventh transistor T7 may be P-type metal-oxide-semiconductor (PMOS) transistors, and the third transistor T3 and the fourth transistor T4 may be N-type metal-oxide-semiconductor NMOS transistors.

The first transistor T1 may include a gate electrode (e.g., a front gate electrode) connected to a first node N1, a first electrode connected to a second node N2, a second electrode connected to a third node N3, and a back gate electrode receiving a bias voltage VOBS. The first transistor T1 may generate a driving current based on a gate-source voltage of the first transistor T1. Therefore, the first transistor T1 may be referred to as a driving transistor. When a driving time of the first transistor T1 increases, a threshold voltage or a hysteresis characteristic of the first transistor T1 may change. When the bias voltage VOBS is applied to a back gate electrode of the first transistor T1, the threshold voltage or the hysteresis characteristic of the first transistor T1 may be enhanced. In an embodiment, the bias voltage VOBS is constant in an address scan period and variable in a self-scan period after the address scan period. A bias voltage VOBS which is constant may be referred to as a fixed bias voltage and a bias voltage VOBS which is variable may be referred to as a variable bias voltage.

The second transistor T2 may include a gate electrode receiving a data write gate signal GW, a first electrode connected to a data line DL transmitting a data voltage VDATA, and a second electrode connected to the second node N2. The second transistor T2 may provide the data voltage VDATA to the second node N2 in response to the data write gate signal GW.

The third transistor T3 may include a gate electrode receiving a compensation gate signal GC, a first electrode connected to the first node N1, and a second electrode connected to the third node N3. The third transistor T3 may diode-connect the first transistor T1 in response to the compensation gate signal GC.

The fourth transistor T4 may include a gate electrode receiving an initialization gate signal GI, a first electrode receiving an initialization voltage VINT, and a second electrode connected to the first node N1. The fourth transistor T4 may provide the initialization voltage VINT to the first node N1 in response to the initialization gate signal GI.

The fifth transistor T5 may include a gate electrode receiving an emission signal EM, a first electrode receiving a first power supply voltage ELVDD, and a second electrode connected to the second node N2. The fifth transistor T5 may determine whether the light emitting element EL emits light in response to the emission signal EM.

The sixth transistor T6 may include a gate electrode receiving the emission signal EM, a first electrode connected to the third node N3, and a second electrode connected to a fourth node N4. The sixth transistor T6 may determine whether the light emitting element EL emits light in response to the emission signal EM.

The seventh transistor T7 may include a gate electrode receiving an anode initialization gate signal GB, a first electrode receiving an anode initialization voltage VAINT, and a second electrode connected to a fourth node N4. The seventh transistor T7 may provide the anode initialization voltage VAINT to the fourth node N4 in response to the anode initialization gate signal GB.

The light emitting element EL may include an anode connected to the fourth node N4 and a second electrode receiving a second power supply voltage ELVSS. The light emitting element EL may emit light based on the driving current.

Figure 4:
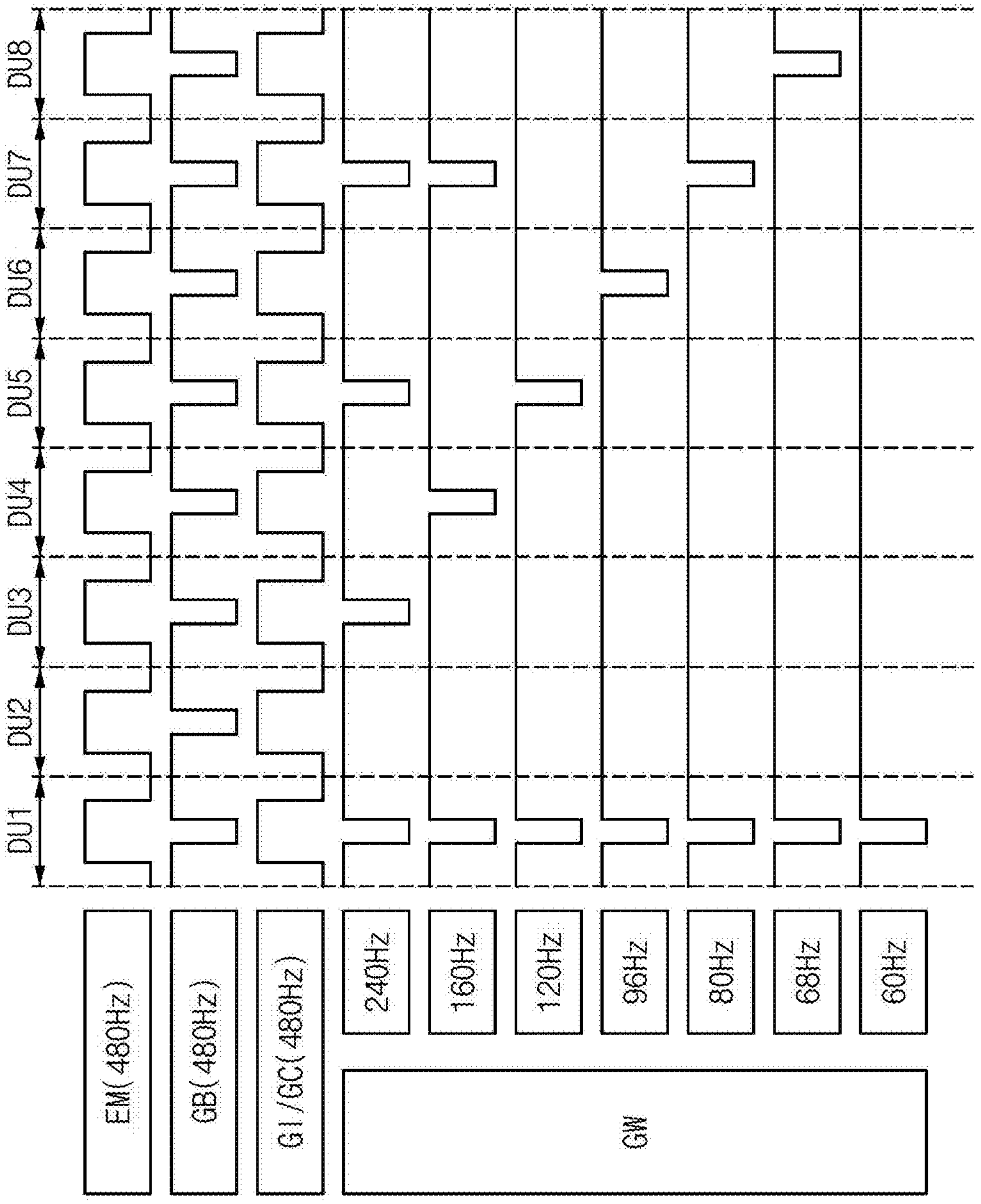
FIG. 4 is a timing diagram showing driving signals of a pixel of FIG. 3 when an emission frequency is 480 Hz.
Figure 5:
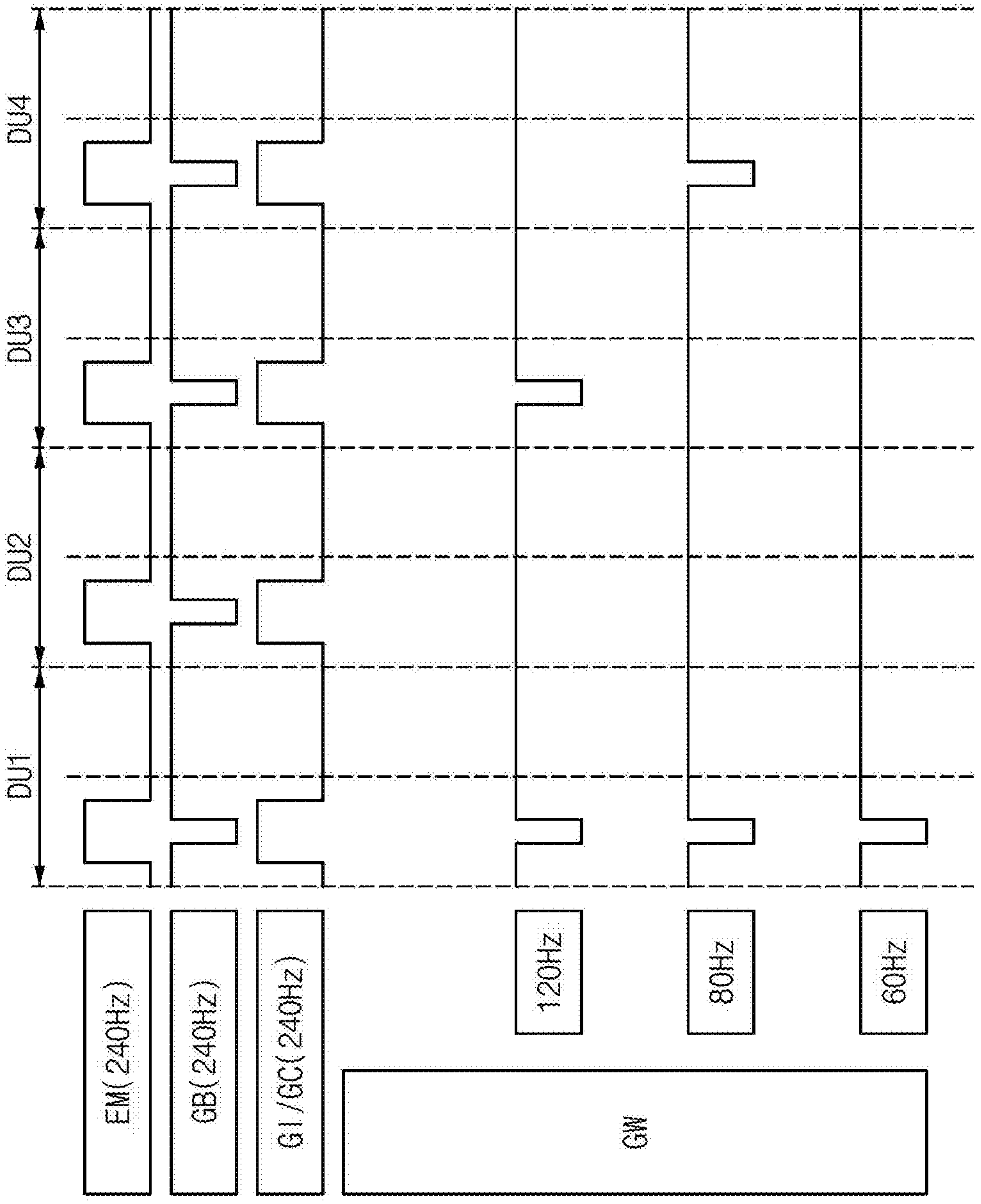
FIG. 5 is a timing diagram showing driving signals of a pixel of FIG. 3 when an emission frequency is 240 Hz.

FIG. 4 is a timing diagram showing driving signals EM, GB, GI, GI, GC, GW of a pixel PX of FIG. 3 when an emission frequency is 480 Hz. FIG. 5 is a timing diagram showing driving signals EM, GB, GI, GI, GC, GW of a pixel PX of FIG. 3 when an emission frequency is 240 Hz.

Referring to FIGS. 1 to 5, a display panel 100 may be driven at a variable frequency.

For example, referring to FIG. 4, the display panel 100 may be driven at a maximum of 240 Hz. When the display panel 100 is driven at 240 Hz, the data write gate signal GW has an active pulse in a first period DU1, a third period DU3, a fifth period DU5, and a seventh period DU7, and a data writing operation may be performed. For convenience of explanation, the data write gate signal GW is shown as having the active pulse in the first period DU1, the third period DU3, the fifth period DU5, and the seventh period DU7, but the data writing operation may continue for two periods of FIG. 4. That is, when the display panel 100 is driven at 240 Hz, a first data writing operation may be performed in first and second periods DU1, DU2, a second data writing operation may be performed in third and fourth periods DU3, DU4, a third data writing operation may be performed in fifth and sixth periods DU5, DU6, and a fourth data writing operation may be performed in seventh and eighth periods DU7, DU8. When the display panel 100 is driven at 120 Hz, the data write gate signal GW has the active pulse in a first period DU1 and a fifth period DU5, and the data writing operation may be performed. The data writing operation may continue for two periods of FIG. 4. That is, when the display panel 100 is driven at 120 Hz, a first data writing operation may be performed in the first and second periods DU1, DU2, and a second data writing operation may be performed in the fifth and sixth periods DU5, DU6.

When the display panel 100 is driven at 240 Hz, a light emitting operation of a light emitting element EL may be performed at 480 Hz, an initialization operation of the light emitting element EL may also be performed at 480 Hz, and an initialization/threshold voltage compensation operation of the first transistor T1 may also be performed at 480 Hz.

As such, when the display panel 100 is driven at 240 Hz and the light emitting operation is driven at 480 Hz, it may be said that the display panel 100 operates in 2 cycles.

When the display panel 100 is driven at 120 Hz, the light emitting operation of the light emitting element EL may be performed at 480 Hz, the initialization operation of the light emitting element EL may also be performed at 480 Hz, and the initialization/threshold voltage compensation operation of the first transistor T1 may also be performed at 480 Hz.

As such, when the display panel 100 is driven at 120 Hz and the light emitting operation is driven at 480 Hz, it may be said that the display panel 100 operates in 4 cycles.

In a display device 10 supporting the variable driving frequency, a driving sequence of the display panel 100 may include an address scan period and a self-scan period after the address scan period.

In an embodiment, the address scan period may be a period in which the data writing operation is performed, and the self-scan period may be a period in which only the light emitting operation is performed without the data writing operation being performed. For example, referring to FIG. 4, when the display panel 100 is driven at 160 Hz, the data writing operation may be performed in the first period DU1, the fourth period DU4, and the seventh period DU7. Therefore, the first period DU1, the fourth period DU4, and the seventh period DU7 may be the address scan period. On the other hand, in the second and third periods DU2, DU3, the fifth and sixth periods DU5, DU6, and the eighth period DU8, the data writing operation is not performed, and only the light emitting operation may be performed. Therefore, the second and third periods DU2, DU3, the fifth and sixth periods DU5, DU6, and the eighth period DU8 may be the self-scan period.

In another embodiment, the address scan period and a first self-scan period after the address scan period may be periods in which the data writing operation is performed, and a self-scan period after the first self-scan period may be a period in which only the light emitting operation is performed without the data writing operation being performed. For convenience of explanation, the data write gate signal GW is shown as having the active pulse in the first period DU1, the fourth period DU4, and the seventh period DU7, but the data writing operation may continue during the two periods of FIG. 4. For example, referring to FIG. 4, when the display panel 100 is driven at 160 Hz, the data writing operation may be performed in the first and second periods DU1, DU2, the fourth and fifth periods DU4, DU5, and the seventh and eighth periods DU7, DU8. Therefore, the first period DU1, the fourth period DU4, and the seventh period DU7 may be the address scan periods, and the second period DU2, the fifth period DU5, and the eighth period DU8 may be the first self-scan periods after the address scan period. On the other hand, in the third period DU3 and the sixth period DU6, the data writing operation may not be performed, and only the light emitting operation may be performed. Therefore, the third period DU3 and the sixth period DU6 may be a self-scan period after the first self-scan period.

Referring to FIG. 5, the display panel 100 may be driven at the variable frequency, for example, at a maximum of 120 Hz. When the display panel 100 is driven at 120 Hz, the data write gate signal GW has the active pulse in a first period DU1 and a third period DU3, and the data writing operation may be performed. When the display panel 100 is driven at 80 Hz, the data write gate signal GW has the active pulse in the first period DU1 and the fourth period DU4, and the data writing operation may be performed.

Figure 6:
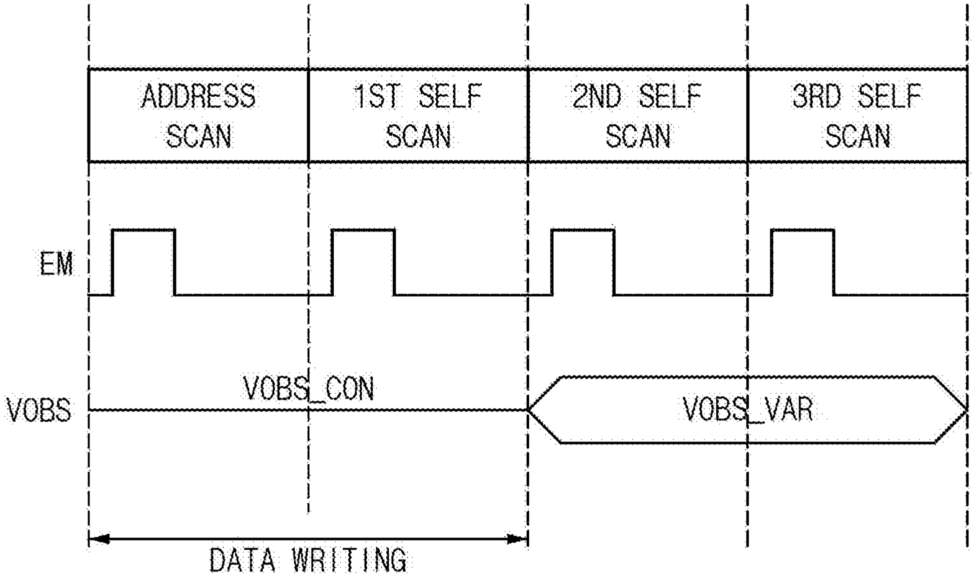
FIG. 6 is a timing diagram showing an example of an emission signal and a bias voltage of FIG. 3.

FIG. 6 is a timing diagram showing an example of an emission signal EM and a bias voltage VOBS of FIG. 3.

Referring to FIGS. 1 to 6, in a display device 10 supporting a variable frequency, a driving sequence of a display panel 100 may include an address scan period and at least one self-scan period after the address scan period. For example, referring to FIG. 6, the driving sequence of the display panel 100 may include an address scan period, a first self-scan period, a second self-scan period, and a third self-scan period.

In an embodiment, a data writing operation may continue during two periods of FIG. 6. That is, the data writing operation may be performed in the address scan period and the first self-scan period. In an embodiment, the data writing operation is not performed in the second self-scan period and the third self-scan period, and only the light emitting operation is performed in the second self-scan period and the third self-scan period.

The display device 10 supporting the variable frequency may include a display panel 100 including a pixel PX, and perform a bias operation in which a bias voltage VOBS is applied to a back gate electrode of a first transistor T1 of the pixel PX. When the bias operation is performed, a threshold voltage or a hysteresis characteristic of the first transistor T1 may be enhanced.

In an embodiment, the bias voltage VOBS has a fixed bias voltage VOBS_CON in the address scan period and the first self-scan period. For example, the fixed bias voltage VOBS_CON may be a constant voltage or a direct current (DC) voltage. For example, the fixed bias voltage VOBS_CON may be a first power supply voltage ELVDD.

In an embodiment, the bias voltage VOBS has a variable bias voltage VOBS_VAR in self-scan periods after the address scan period. For example, the bias voltage VOBS may have the variable bias voltage VOBS_VAR in the second self-scan period and the third self-scan period. The variable bias voltage VOBS_VAR may have a value between a voltage lower by a setting voltage from the fixed bias voltage VOBS_CON and a voltage higher by the setting voltage from the fixed bias voltage VOBS_CON. For example, the variable bias voltage VOBS_VAR may range from a value that is lower than the fixed bias voltage VOBS_CON by a preset voltage to a value that is higher than VOBS_CON by the same preset voltage. For example, the fixed bias voltage VOBS_CON may be the first power supply voltage ELVDD, and the setting voltage may be 4 V. When the bias voltage VOBS has the fixed bias voltage VOBS_CON in the address scan period and the first self-scan period, the variable bias voltage VOBS_VAR may be a global signal which is simultaneously provided to several pixel rows.

In an embodiment, the variable bias voltage VOBS_VAR varies based on the threshold voltage or the hysteresis characteristic of the first transistor T1. The variable bias voltage VOBS_VAR or a value representing the variable bias voltage VOBS_VAR may be stored in a memory in a form of a lookup table through multi-time programming, and the display device 10 may further include the memory.

Assuming a fixed bias voltage VOBS_CON of 12 V and a setting voltage of 4 V, the variable bias voltage VOBS_VAR may range between 8 V and 16 V. In FIG. 6, the display panel operates over four periods: an address scan period (DU1), a first self-scan period (DU2), and two additional self-scan periods (DU3 and DU4). During DU1 and DU2, the bias voltage VOBS applied to the back gate of the driving transistor D1 is held constant at 12 V to ensure stable data writing and initial light emission. Starting in DU3, the bias voltage begins to vary; for instance, decreasing to 11 V in DU3 and remaining at that level in DU4. This controlled variation in the bias voltage during the self-scan periods may help to compensate for threshold voltage shift and hysteresis in the driving transistor D1.

Figure 7:
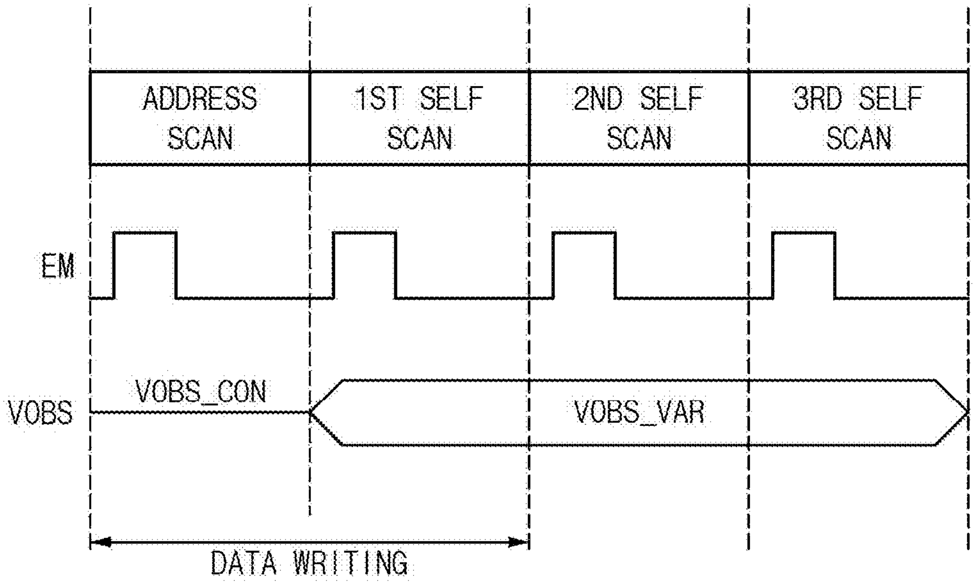
FIG. 7 is a timing diagram showing an example of an emission signal and a bias voltage of FIG. 3.
Figure 8:
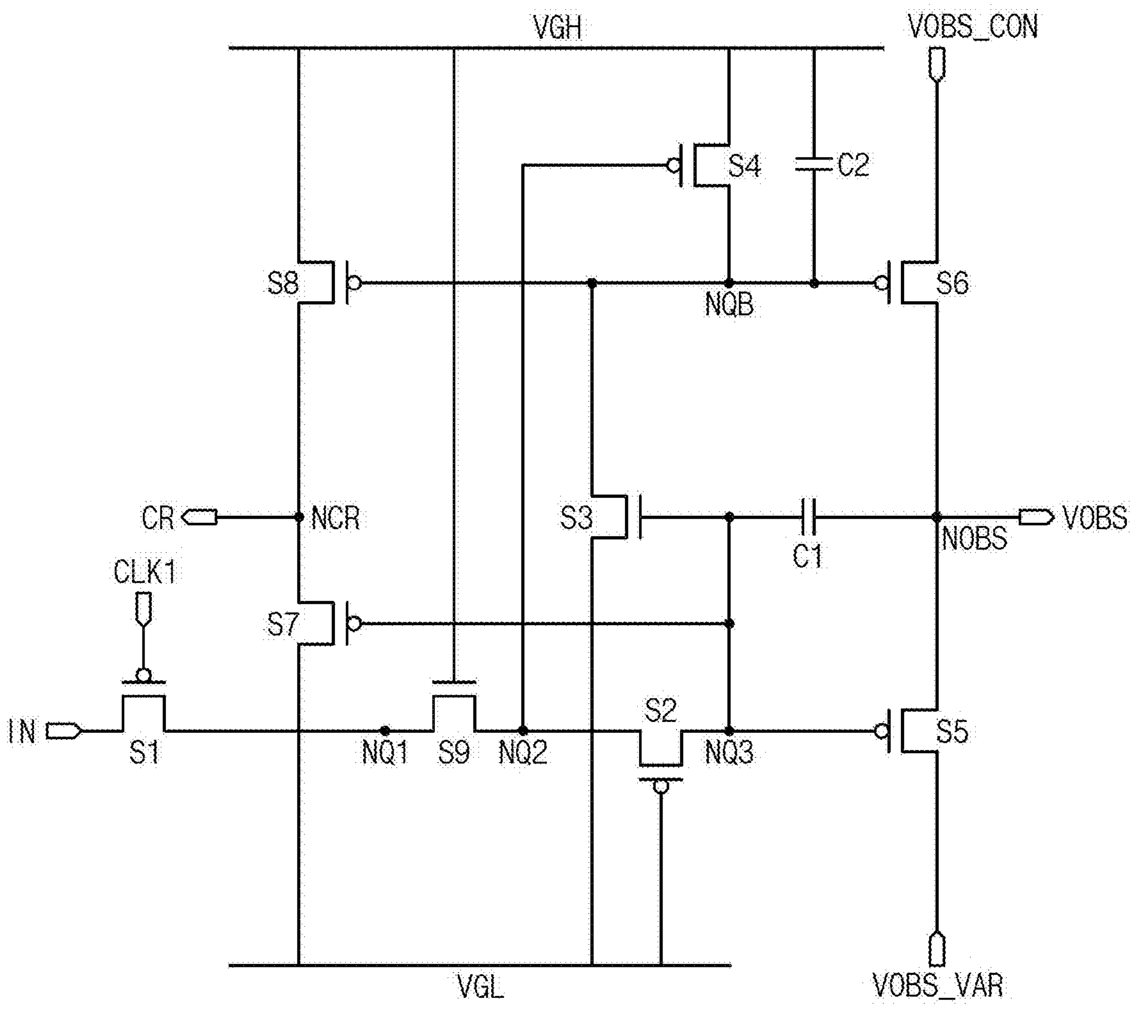
FIG. 8 is a circuit diagram showing a signal generator which generates a bias voltage.

FIG. 7 is a timing diagram showing an example of an emission signal EM and a bias voltage VOBS of FIG. 3. FIG. 8 is a circuit diagram showing a signal generator which generates the bias voltage VOBS.

Referring to FIGS. 1 to 5 and FIG. 7, a driving sequence of a display panel 100 in a display device 10 supporting a variable driving frequency may include an address scan period and a self-scan period after the address scan period. For example, referring to FIG. 7, the driving sequence of the display panel 100 may include an address scan period, a first self-scan period, a second self-scan period, and a third self-scan period.

In an embodiment, a data writing operation continues during two periods of FIG. 7. That is, the data writing operation may be performed in the address scan period and the first self-scan period. In this embodiment, the data writing operation is not performed in the second self-scan period and the third self-scan period and only the light emitting operation is performed in the second self-scan period and the third self-scan period.

The display device 10 supporting the variable driving frequency may include a display panel 100 including a pixel PX, and perform a bias operation in which the bias voltage VOBS is applied to a back gate electrode of a first transistor T1 of the pixel PX. When the bias operation is performed, a threshold voltage or a hysteresis characteristic of the first transistor T1 may be enhanced.

In an embodiment, the bias voltage VOBS has a fixed bias voltage VOBS_CON in the address scan period. The fixed bias voltage VOBS_CON may be a constant voltage. For example, the fixed bias voltage VOBS_CON may be a first power supply voltage ELVDD.

In an embodiment, the bias voltage VOBS has a variable bias voltage VOBS_VAR in self-scan periods after the address scan period. For example, the bias voltage VOBS may have the variable bias voltage VOBS_VAR in the first self-scan period, the second self-scan period, and the third self-scan period. The variable bias voltage VOBS_VAR may have a value between a voltage lower by a setting voltage from the fixed bias voltage VOBS_CON and a voltage higher by the setting voltage from the fixed bias voltage VOBS_CON. For example, the fixed bias voltage VOBS_CON may be the first power supply voltage ELVDD, and the setting voltage may be 4 V. When the bias voltage VOBS has the fixed bias voltage VOBS_CON only in the address scan period, the variable bias voltage VOBS_VAR may be a sequential signal sequentially provided to several pixel rows. When the variable bias voltage VOBS_VAR is the sequential signal, the variable bias voltage VOBS_VAR may be generated by a signal generator, and the display device 10 may further include the signal generator. For example, the variable bias voltage VOBS_VAR may be sequentially applied to multiple pixels rows.

The variable bias voltage VOBS_VAR may vary based on the threshold voltage or the hysteresis characteristic of the first transistor T1. The variable bias voltage VOBS_VAR or a value representing the same may be stored in a memory in a form of a lookup table through multi-time programming, and the display device 10 may further include the memory.

Assuming a fixed bias voltage VOBS_CON of 12 V and a setting voltage of 4 V, the variable bias voltage VOBS_VAR may range between 8 V and 16 V. In FIG. 7, the display panel operates over four periods: an address scan period (DU1), a first self-scan period (DU2), and additional self-scan periods (DU3 and DU4). During the address scan period (DU1), the bias voltage applied to the back gate of the driving transistor D1 is held constant at 12 V to support accurate data writing. Starting in the first self-scan period (DU2), the bias voltage begins to vary; for example, it may decrease to 11 V in DU2 and remain at that level through DU3 and DU4.

The bias voltage VOBS may be sequentially applied to the pixels in a row unit by the signal generator. For example, the signal generator may sequentially generate the bias voltage VOBS in synchronization with a scan driving signal (e.g., a control signal) output from the gate driver 300. The signal generator may apply a fixed bias voltage to the back gate electrode during an address scan period and apply a variable bias voltage to the back gate electrode during a self-scan period following the address scan period, in synchronization with the scan driving signal. The driving controller 200 may determine the fixed bias voltage, determine the variable bias voltage, and control the gate driver 300 to provide gate signals to gate lines of the display panel and the scan driving signal.

Referring to FIGS. 1 to 5, 7, and 8, the signal generator may include a plurality of stages.

Each of the stages may include first to ninth switching elements S1 to S9, a first capacitor C1, and a second capacitor C2. The first switching element S1, the second switching element S2, the fourth switching element S4, the fifth switching element S5, the sixth switching element S6, the seventh switching element S7, and the eighth switching element S8 may be PMOS transistors, and the third switching element S3 and the ninth switching element S9 may be NMOS transistors.

The first switching element S1 may include a gate electrode receiving a first clock signal CLK1, a first electrode receiving an input signal IN, and a second electrode connected to a first control node NQ1.

The second switching element S2 may include a gate electrode receiving a low gate voltage VGL, a first electrode connected to a second control node NQ2, and a second electrode connected to a third control node NQ3.

The third switching element S3 may include a gate electrode connected to the third control node NQ3, a first electrode receiving the low gate voltage VGL, and a second electrode connected to an inversion control node NQB.

The fourth switching element S4 may include a gate electrode connected to the second control node NQ2, a first electrode receiving a high gate voltage VGH, and a second electrode connected to the inversion control node NQB.

The fifth switching element S5 may include a gate electrode connected to the third control node NQ3, a first electrode receiving the variable bias voltage VOBS_VAR, and a second electrode connected to a bias output node NOBS from which the bias voltage VOBS is output.

The sixth switching element S6 may include a gate electrode connected to the inversion control node NQB, a first electrode receiving the fixed bias voltage VOBS_CON, and a second electrode connected to the bias output node NOBS.

The seventh switching element S7 may include a gate electrode connected to the third control node NQ3, a first electrode receiving the high gate voltage VGH, and a second electrode connected to a carry output node NCR from which a carry signal CR is output.

The eighth switching element S8 may include a gate electrode connected to the inversion control node NQB, a first electrode receiving the high gate voltage VGH, and a second electrode connected to the carry output node NCR.

The ninth switching element S9 may include a gate electrode receiving the high gate voltage VGH, a first electrode connected to the first control node NQ1, and a second electrode connected to the second control node NQ2.

The first capacitor C1 may include a first electrode connected to the third control node NQ3 and a second electrode connected to the bias output node NOBS.

The second capacitor C2 may include a first electrode receiving the high gate voltage VGH and a second electrode connected to the inversion control node NQB.

Figure 9:
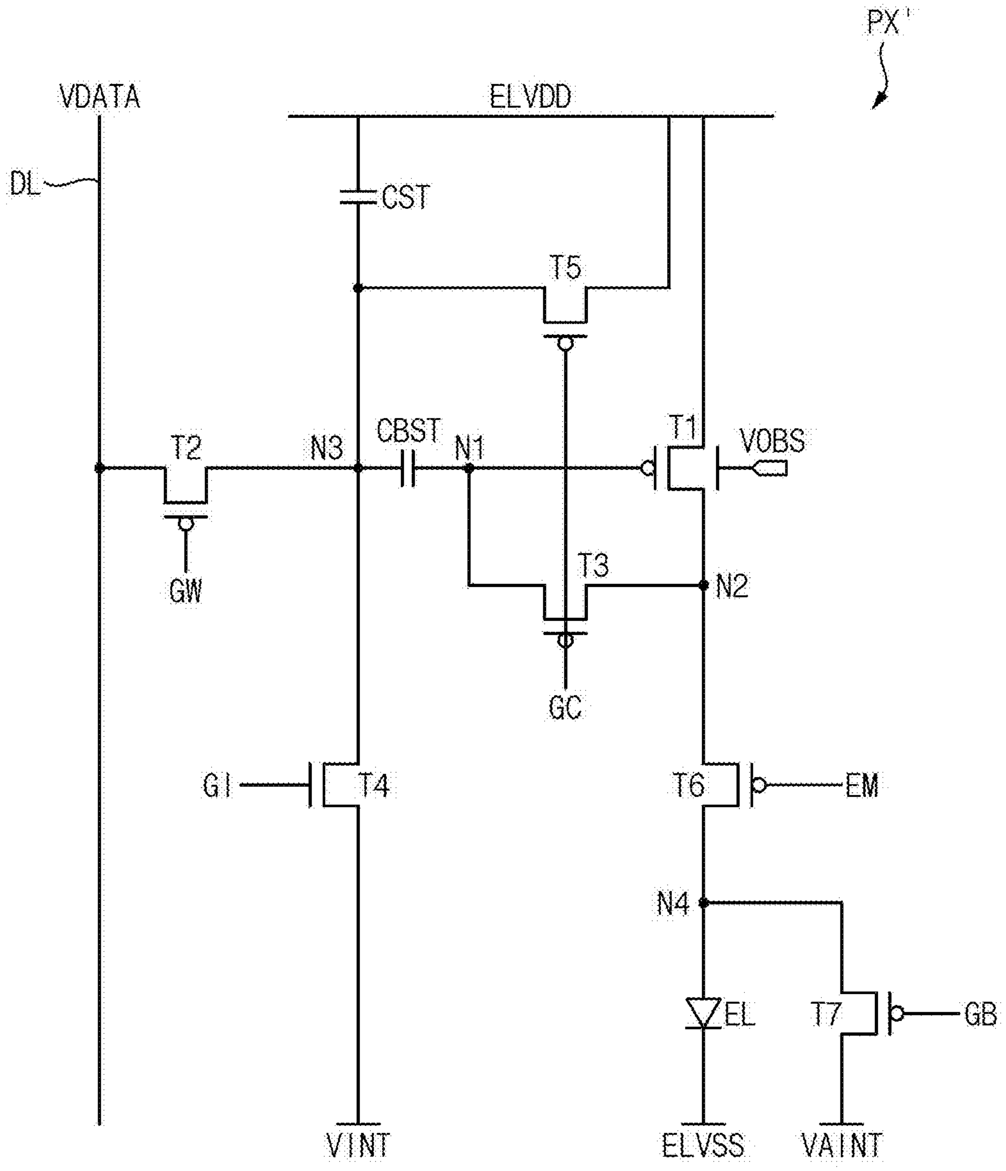
FIG. 9 is a circuit diagram showing an example of a pixel of FIG. 1.

FIG. 9 is a circuit diagram showing an example PX' of a pixel PX of FIG. 1.

Referring to FIGS. 1 to 9, when a bias voltage VOBS is applied to a back gate electrode of a first transistor T1 of a pixel PX of FIG. 2, a threshold voltage or a hysteresis characteristic of the first transistor T1 may be enhanced. This is not limited to the pixel PX of FIG. 2. The pixel PX' of FIG. 9 is an example.

The pixel PX' may include first to seventh transistors T1 to T7, a storage capacitor CST, a boost capacitor CBST, and a light emitting element EL. In an embodiment, the first to third transistors T1 to T3 and the fifth to seventh transistors T5 to T7 may be PMOS transistors, and the fourth transistor T4 may be an NMOS transistor.

The first transistor T1 may include a gate electrode connected to a first node N1, a first electrode receiving a first power supply voltage ELVDD, a second electrode connected to a second node N2, and a back gate electrode receiving a bias voltage VOBS. The first transistor T1 may generate a driving current based on a gate-source voltage of the first transistor T1. Therefore, the first transistor T1 may be referred to as a driving transistor. When a driving time of the first transistor T1 increases, a threshold voltage or a hysteresis characteristic of the first transistor T1 may change. When the bias voltage VOBS is applied to the back gate electrode of the first transistor T1, the threshold voltage or the hysteresis characteristic of the first transistor T1 may be enhanced. In an embodiment, the bias voltage VOBS is constant in an address scan period and varies in a self-scan period after the address scan period. The constant bias voltage VOBS may be referred to as a fixed bias voltage, and the variable bias voltage VOBS may be referred to as a variable bias voltage.

The second transistor T2 may include a gate electrode receiving a data write gate signal GW, a first electrode connected to a data line DL transmitting a data voltage VDATA, and a second electrode connected to a third node N3. The second transistor T2 may provide the data voltage VDATA to the third node N3 in response to the data write gate signal GW.

The third transistor T3 may include a gate electrode receiving a compensation gate signal GC, a first electrode connected to the first node N1, and a second electrode connected to the second node N2. The third transistor T3 may diode-connect the first transistor T1 in response to the compensation gate signal GC.

The fourth transistor T4 may include a gate electrode receiving an initialization gate signal GI, a first electrode receiving an initialization voltage VINT, and a second electrode connected to the third node N3. The fourth transistor T4 may provide the initialization voltage VINT to the third node N3 in response to the initialization gate signal GI.

The fifth transistor T5 may include a gate electrode receiving the compensation gate signal GC, a first electrode receiving the first power supply voltage ELVDD, and a second electrode connected to the third node N3. The fifth transistor T5 may provide the first power supply voltage ELVDD to the third node N3 in response to the compensation gate signal GC.

The sixth transistor T6 may include a gate electrode receiving an emission signal EM, a first electrode connected to the second node N2, and a second electrode connected to a fourth node N4. The sixth transistor T6 may determine whether the light emitting element EL emits light in response to the emission signal EM.

The seventh transistor T7 may include a gate electrode receiving an anode initialization gate signal GB, a first electrode receiving an anode initialization voltage VAINT, and a second electrode connected to the fourth node N4. The seventh transistor T7 may provide the anode initialization voltage VAINT to the fourth node N4 in response to the anode initialization gate signal GB.

The storage capacitor CST may include a first electrode receiving the first power supply voltage ELVDD and a second electrode connected to the third node N3.

The boost capacitor CBST may include a first electrode connected to the first node N1 and a second electrode connected to the third node N3.

The light emitting element EL may include an anode connected to the fourth node N4 and a cathode receiving a second power supply voltage ELVSS.

The pixel PX' of FIG. 9 differs from the pixel PX of FIG. 3, in that PX' additionally includes a boost capacitor CBST connected between the gate node N1 and the data storage node N3 of the driving transistor D1. This boost capacitor CBST in PX' may help enhance the gate voltage swing of the driving transistor D1 during compensation and emission phases, potentially enhancing current drive performance, reducing programming error, and enhancing luminance uniformity.

Figure 10:
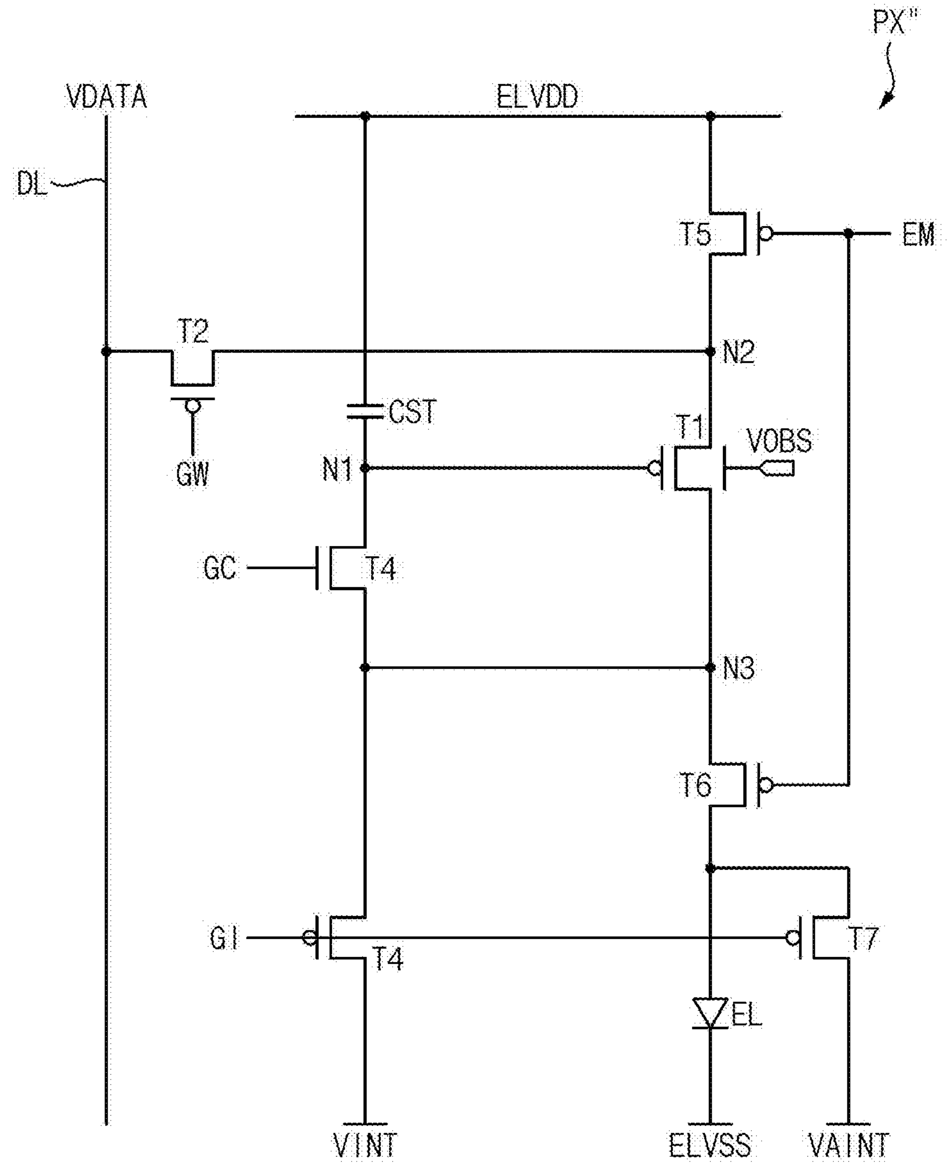
FIG. 10 is a circuit diagram showing an example of a pixel of FIG. 1.

FIG. 10 is a circuit diagram showing an example PX" of a pixel PX of FIG. 1.

Referring to FIGS. 1 to 8 and FIG. 10, when a bias voltage VOBS is applied to a back gate electrode of a first transistor T1 of a pixel PX of FIG. 2, a threshold voltage or a hysteresis characteristic of the first transistor T1 may be enhanced. This is not limited to a pixel PX of FIG. 2. A pixel PX" of FIG. 10 is an example.

A pixel PX" may include first to seventh transistors T1 to T7, a storage capacitor CST, and a light emitting element EL. In an embodiment, the first to third transistors T1 to T3 and the fifth to seventh transistors T5 to T7 may be PMOS transistors, and the fourth transistor T4 may be an NMOS transistor.

The first transistor T1 may include a gate electrode connected to a first node N1, a first electrode connected to a second node N2, a second electrode connected to a third node N3, and a back gate electrode receiving a bias voltage VOBS. The first transistor T1 may generate a driving current based on a gate-source voltage of the first transistor T1. Therefore, the first transistor T1 may be referred to as a driving transistor. When a driving time of the first transistor T1 increases, a threshold voltage or a hysteresis characteristic of the first transistor T1 may change. When the bias voltage VOBS is applied to the back gate electrode of the first transistor T1, the threshold voltage or the hysteresis characteristic of the first transistor T1 may be enhanced. The bias voltage VOBS may be constant in an address scan period and may be variable in a self-scan period after the address scan period. The constant bias voltage VOBS may be referred to as a fixed bias voltage, and the variable bias voltage VOBS may be referred to as a variable bias voltage.

The second transistor T2 may include a gate electrode receiving a data write gate signal GW, a first electrode connected to a data line DL transmitting a data voltage VDATA, and a second electrode connected to the second node N2. The second transistor T2 may provide the data voltage VDATA to the second node N2 in response to the data write gate signal GW.

The third transistor T3 may include a gate electrode receiving a compensation gate signal GC, a first electrode connected to the first node N1, and a second electrode connected to the third node N3. The third transistor T3 may diode-connect the first transistor T1 in response to the compensation gate signal GC.

The fourth transistor T4 may include a gate electrode receiving an initialization gate signal GI, a first electrode receiving an initialization voltage VINT, and a second electrode connected to the third node N3. The fourth transistor T4 may provide the initialization voltage VINT to the third node N3 in response to the initialization gate signal GI.

The fifth transistor T5 may include a gate electrode receiving an emission signal EM, a first electrode receiving a first power supply voltage ELVDD, and a second electrode connected to the second node N2. The fifth transistor T5 may determine whether the light emitting element EL emits light in response to the emission signal EM.

The sixth transistor T6 may include a gate electrode receiving the emission signal EM, a first electrode connected to the third node N3, and a second electrode connected to a fourth node N4. The sixth transistor T6 may determine whether the light emitting element EL emits the light in response to the emission signal EM.

The seventh transistor T7 may include a gate electrode receiving the initialization gate signal GI, a first electrode receiving an anode initialization voltage VAINT, and a second electrode connected to the fourth node N4. The seventh transistor T7 may provide the anode initialization voltage VAINT to the fourth node N4 in response to the initialization gate signal GI.

The light emitting element EL may include an anode connected to the fourth node N4 and a cathode receiving a second power supply voltage ELVSS.

PX" differs from PX in that PX" additionally modifies the transistor terminal connections and control signal assignments to potentially simplify the driving scheme and enhance layout flexibility. In PX", the first electrode of the driving transistor T1 is connected to a second node N2 rather than to a power supply line, potentially affecting how the driving current flows through the circuit. Moreover, transistor T7 in PX" receives the initialization gate signal GI rather than a separate anode initialization signal GB as in PX. This change may reduce the number of unique control signals needed, streamlining the pixel control scheme.

Figure 11:
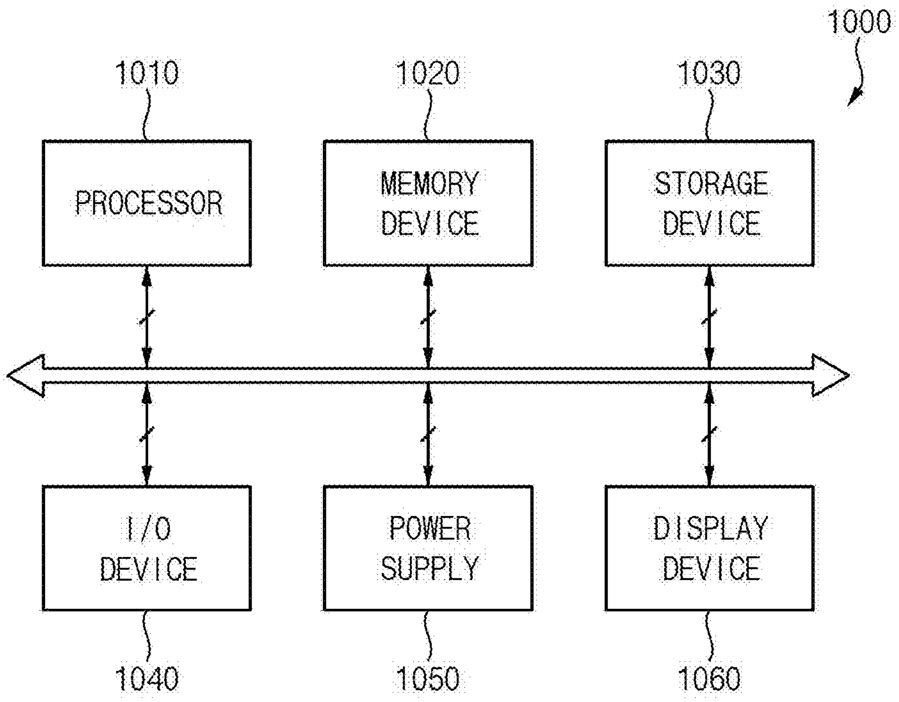
FIG. 11 is a block diagram showing an electronic device.
Figure 12:
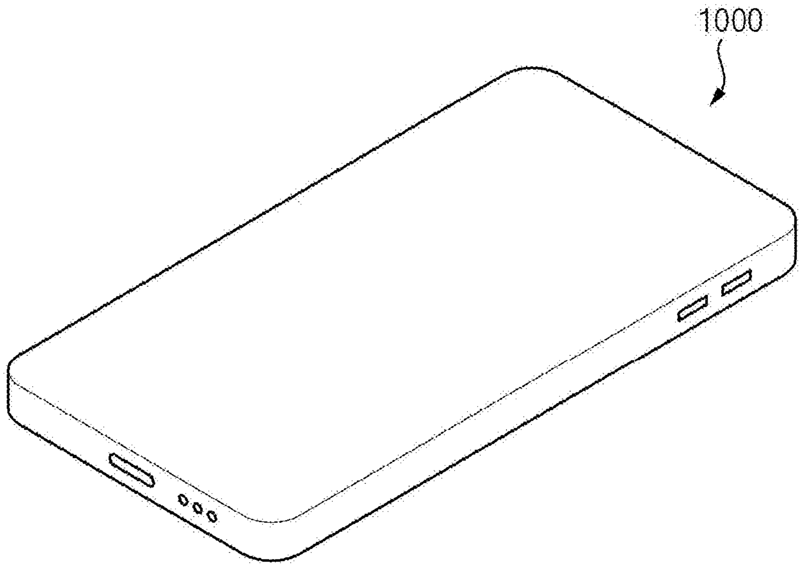
FIG. 12 is a diagram showing an embodiment in which an electronic device of FIG. 11 is implemented as a smart phone.

FIG. 11 is a block diagram showing an electronic device. FIG. 12 is a diagram showing an embodiment in which an electronic device of FIG. 11 is implemented as a smart phone.

Referring to FIGS. 11 and 12, an electronic device 1000 may include a processor 1010, a memory device 1020, a storage device 1030, an input/output I/O device 1040, a power supply 1050, and a display device 1060. The display device 1060 may be the display device 10 of FIG. 1. In addition, the electronic device 1000 may further include a plurality of ports for communicating with a video card, a sound card, a memory card, a universal serial bus USB device, other electronic device, and the like.

In an embodiment, as shown in FIG. 12, the electronic device 1000 may be implemented as the smart phone. However, the electronic device 1000 is not limited thereto. For example, the electronic device 1000 may be implemented as a cellular phone, a video phone, a smart pad, a smart watch, a tablet PC, a car navigation system, a computer monitor, a laptop, a head mounted display HMD device, and the like.

The processor 1010 may perform various computing functions. The processor 1010 may be a micro processor, a central processing unit CPU, an application processor AP, and the like. The processor 1010 may be coupled to other components via an address bus, a control bus, a data bus, and the like. Further, the processor 1010 may be coupled to an extended bus such as a peripheral component interconnection PCI bus.

The memory device 1020 may store data for operations of the electronic device 1000. For example, the memory device 1020 may include at least one nonvolatile memory device such as an erasable programmable read-only memory EPROM device, an electrically erasable programmable read-only memory EEPROM device, a flash memory device, a phase change random access memory PRAM device, a resistance random access memory RRAM device, a nano floating gate memory NFGM device, a polymer random access memory PoRAM device, a magnetic random access memory MRAM device, a ferroelectric random access memory FRAM device, and the like and/or at least one volatile memory device such as a dynamic random access memory DRAM device, a static random access memory SRAM device, a mobile DRAM device, and the like.

The storage device 1030 may include a solid state drive SSD device, a hard disk drive HDD device, a CD-ROM device, and the like.

The I/O device 1040 may include an input device such as a keyboard, a keypad, a mouse device, a touch-pad, a touch-screen, and the like, and an output device such as a printer, a speaker, and the like. In some embodiments, the I/O device 1040 may include the display device 1060.

The power supply 1050 may provide power for operations of the electronic device 1000.

The display device 1060 may be connected to other components through buses or other communication links.

Figure 13:
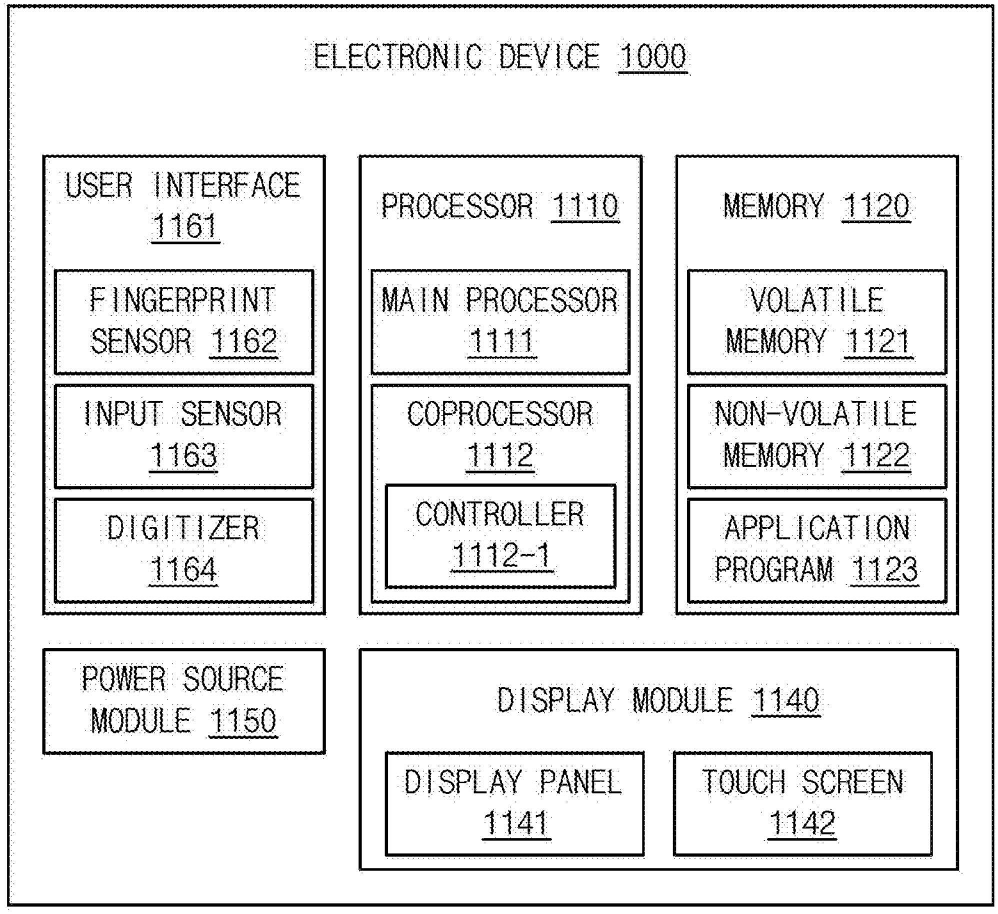
FIG. 13 is a block diagram showing the electronic device according to an example embodiment.

FIG. 13 is a diagram illustrating an electronic device according to an embodiment of the present invention. Referring to FIG. 13, the electronic device 1000 according to one embodiment of the present invention may output various information (e.g., images, text, music, etc.) through a display module 1140, which, for example, may correspond to the display device shown in FIG. 1. When a processor 1110 (e.g., 1010) executes an application stored in a memory 1120 (e.g., 1020), the display module 1140 (e.g., 1060) may provide application information to a user through a display panel 1141.

In some embodiments, the electronic device 1000 may be configured as a smartphone, camera, smart TV, monitor, smartwatch, tablet, automotive display, or AR/VR headset. For example, the electronic device 1000 may be a smartphone including a touch-sensitive display area DA for interaction and a non-display area NDA including sensors and circuits for enhanced functionality. For example, the electronic device 1000 may be a television or monitor including a large display area DA for high-resolution video playback and a non-display area NDA incorporating driving circuits or connectivity modules for external inputs. For example, the electronic device 1000 may be a smartwatch including a display area DA optimized for compact and high-clarity visuals and a non-display area NDA integrating biometric sensors for health monitoring. In some cases, the electronic device 1000 may be an AR/VR headset.

In some embodiments, memory 1120 may store information such as software codes for operating an application program 1123. The application program 1123 may include software designed to execute specific tasks or provide functionality to a user. The application program 1123 may operate under the control of the processor 1110 and utilizes data stored in the memory 1120 to deliver a wide range of features, such as productivity tools, multimedia streaming and playback, file or mail deliveries or communication services. The application program 1123 interacts seamlessly with the user interface 1161 or touch screen 1142, allowing a user to launch, navigate, and utilize the program through user inputs such as touch, tap, gesture, or voice interaction.

Upon user selection of an application via touch screen 1142 or user interface 1161, the processor 1110 may execute the application program 1123 corresponding to the selected application retrieved from the memory 1120 to perform functionalities of the application. For example, when a user selects a camera application by tapping the icon (or a camera application icon) presented on the display panel 1141, the processor 1110 activates a camera module. The processor 1110 may transmit image data corresponding to a captured image acquired through the camera module to the display module 1140. The display module 1140 may display an image corresponding to the captured image through the display panel 1141.

As another example, when a user wishes to make a phone call, the user taps the telephone icon displayed on the display module 1140, the processor 1110 may execute a phone application program stored in the memory 1120. A telephone keypad may be presented on the display panel 1141 for the user to enter a phone number to call.

As another example, the display module 1140 may be integrated into an electronic device 1000, such as a laptop computer, smart TV, or tablet. A user wishing to access a multimedia streaming application (e.g., to watch a music video or movie) can do so by tapping the corresponding icon. This action activates the application, allowing the user to view the streamed content.

The processor 1110 may include a main processor 1111 and an auxiliary or coprocessor 1112. The main processor 1111 may include a central processing unit (CPU). The main processor 1111 may further include one or more of a graphics processing unit (GPU), a communication processor (CP), and an image signal processor (ISP).

The coprocessor 1112 may include a controller 1112-1. The controller 1112-1 may include an interface conversion circuit and a timing control circuit. The controller 1112-1 may receive an image signal from the main processor 1111, convert the data format of the image signal to match the interface specifications with the display module 1140, and output image data. The controller 1112-1 may output various control signals to drive the display module 1140. For example, the controller 1112-1 may drive the display module 1140 to display the icon on the display screen suitable for selection by a user to cause execution of an application program 1123.

The memory 1120 may store one or more application programs 1123 and various data used by at least one component (for example, the processor 1110 or the user interface 1161) of the electronic device 1000 and input data or output data for commands related thereto. For example, a camera application program, a GPS application program, an augmented reality and virtual reality application program, and other application programs that can be executed by the processor 1110 upon selection of corresponding icons presented on the display screen (or display panel 1141) via the touch screen 1142 or user interface 1161 by the user. In addition, various setting data corresponding to user settings may be stored in the memory 1120. The memory 1120 may include volatile memory 1121 and non-volatile memory 1122.

The display module 1140 may output visual information (images) to the user. The display module 1140 may include the display panel 1141, a gate driver, the source driver, a voltage generation circuit, and a touch screen 1142. The display module 1140 may further include a window, a chassis, and a bracket to protect the display panel 1141. The display module 1140 may include at least a part of the configuration of the display device shown in FIG. 1.

The user interface 1161 serves as the interaction medium between a user and the electronic device 1000. The user interface 1161 may detect an input by a part (e.g., finger) of a user's body or an input by a pen or a mouse, and generate an electric signal or data value corresponding to the input. The user interface 1161 includes the fingerprint sensor 1162, the input sensor 1163, and a digitizer 1164.

The fingerprint sensor 1162 may sense a fingerprint for biometric recognition of the user and may also measure one or more biological signals such as blood pressure, moisture, or body mass.

The input sensor 1163 may sense user interactions including touch, tap, gesture, motion, spoken command, and eye movement. The input sensor 1163 includes optical sensors for image capture, eye tracking, or motion and gesture detection. Optical sensors may be infrared or semiconductor photodetectors. The input sensor 1163 includes audio and acoustic sensors, which may be MEMS microphones for voice recognition or sound-based interaction. The audio and acoustic sensors can be installed as part of the user interface 1161 or embedded in the display panel 1141.

The digitizer 1164 may generate a data value corresponding to coordinate information of input by a pen or a mouse to control movement of an onscreen cursor. The digitizer 1164 may generate the amount of change in electromagnetic due to the input as the data value. The digitizer may detect an input by a passive pen or transmit and receive data with an active pen or a remote.

At least one of the fingerprint sensor 1162, the input sensor 1163, or the digitizer 1164 may be implemented as a sensor layer formed on the top layer of the display panel 1141 through a continuous process with a process of forming elements (for example, the light emitting element, the transistor, and the like) included in the display panel 1141.

In addition, the user interface 1161 may further include, for example, a gesture sensor, a gyro sensor that senses rotational movements, an acceleration sensor to track translational movement, a grip sensor, a pressure sensor, a proximity sensor, a color sensor, an infrared (IR) emitter and camera sensor for tracking gaze direction and eye movements, a temperature sensor, or a light sensor. For example, the gyro sensor, acceleration sensor, and infrared emitter and camera may be particularly suitable for AR/VR headset functions.

The touch screen 1142 includes touch sensors embedded in semiconductor layers of the display panel 1141 to sense pressure applied to the top layer (screen) of the display panel 1141. The touch sensors can be a capacitive or a resistive type. The touch screen 1142 may serve as the primary interface for the user to select and navigate applications, control, and interact with the electronic device 1000.

The display panel 1141 (or display) may include a liquid crystal display panel, an organic light emitting display panel, or an inorganic light emitting display panel, and the type of the display panel 1141 is not particularly limited. The display panel 1141 may be of a rigid type or a flexible type that can be rolled or folded. The display module 1140 may further include a supporter, bracket, heat dissipation member, and the like that support the display panel 1141. The display module 1140 may be used to implement the display device 1060. The display panel 1141 may include the display unit shown in FIG. 1.

The power source module 1150 (e.g., 1050) may supply power to the components of the electronic device 1000. The power source module 1150 may be used to implement the power supply 1050. The power source module 1150 may include a battery that charges the power source voltage. The battery may include a non-rechargeable primary battery or a rechargeable secondary battery or fuel cell. The power source module 1150 may include a power management integrated circuit (PMIC). The PMIC may supply optimized power source to each of the components described above including the display module 1140.

The inventive concepts may be applied to any display device and any electronic device including the touch panel. For example, the inventive concepts may be applied to a mobile phone, a smart phone, a tablet computer, a digital television TV, a 3D TV, a personal computer PC, a home appliance, a laptop computer, a personal digital assistant PDA, a portable multimedia player PMP, a digital camera, a music player, a portable game console, a navigation device, etc.

The foregoing is illustrative of the inventive concept and is not to be construed as limiting thereof. Although a few embodiments of the inventive concept have been described, those skilled in the art will readily appreciate that many modifications are possible in the embodiments without materially departing from the teachings of the inventive concept. Accordingly, all such modifications are intended to be included within the scope of the inventive concept as defined in the claims. In the claims, means-plus-function clauses are intended to cover the structures described herein as performing the recited function and not only structural equivalents but also equivalent structures. Therefore, it is to be understood that the foregoing is illustrative of the inventive concept and is not to be construed as limited to the specific embodiments disclosed, and that modifications to the disclosed embodiments, as well as other embodiments, are intended to be included within the scope of the appended claims.

What is claimed is:

1. A display device, comprising:

a display panel including a pixel including a light emitting element, and a first transistor configured to generate a driving current based on a first power supply voltage and a second power supply voltage and to provide the driving current to the light emitting element;

a gate driver configured to provide a gate signal to the pixel;

a data driver configured to provide a data voltage to the pixel; and a driving controller configured to control the gate driver and the data driver, wherein the first transistor includes a back gate electrode receiving a bias voltage, and wherein the bias voltage is a fixed bias voltage during an address scan period and a variable bias voltage during a self-scan period after the address scan period.

2. The display device of claim 1, wherein the first transistor is a P-type Metal-Oxide-Semiconductor (PMOS) transistor.

3. The display device of claim 1, wherein the fixed bias voltage is the first power supply voltage.

4. The display device of claim 1, wherein the variable bias voltage is within a range defined by the fixed bias voltage plus or minus a setting voltage.

5. The display device of claim 1, wherein the variable bias voltage varies based on a threshold voltage or a hysteresis characteristic of the first transistor.

6. The display device of claim 1, wherein in the address scan period and a first self-scan period after the address scan period, the data voltage is provided to the pixel, and in a second self-scan period after the first self-scan period, the data voltage is not provided to the pixel.

7. The display device of claim 6, wherein, when the bias voltage is the fixed bias voltage in the address scan period and the first self-scan period, and the bias voltage is the variable bias voltage in the second self-scan period, the variable bias voltage is a global signal simultaneously provided to pixel rows of the display panel.

8. The display device of claim 6, wherein, when the bias voltage is the fixed bias voltage in the address scan period and the bias voltage is the variable bias voltage in the first self-scan period and the second self-scan period, the variable bias voltage is a sequential signal sequentially provided to pixel rows of the display panel.

9. The display device of claim 8, wherein, when the variable bias voltage is the sequential signal, the display device further includes a signal generator including a plurality of stages, and wherein each of the stages comprises:

a first switching element including a gate electrode receiving a first clock signal, a first electrode receiving an input signal, and a second electrode connected to a first control node;

a second switching element including a gate electrode receiving a low gate voltage, a first electrode connected to a second control node, and a second electrode connected to a third control node;

a third switching element including a gate electrode connected to the third control node, a first electrode receiving the low gate voltage, and a second electrode connected to an inversion control node;

a fourth switching element including a gate electrode connected to the second control node, a first electrode receiving a high gate voltage, and a second electrode connected to the inversion control node;

a fifth switching element including a gate electrode connected to the third control node, a first electrode receiving the variable bias voltage, and a second electrode connected to a bias output node from which the bias voltage is output;

a sixth switching element including a gate electrode connected to the inversion control node, a first electrode receiving the fixed bias voltage, and a second electrode connected to the bias output node;

a seventh switching element including a gate electrode connected to the third control node, a first electrode receiving the high gate voltage, and a second electrode connected to a carry output node from which a carry signal is output;

an eighth switching element including a gate electrode connected to the inversion control node, a first electrode receiving the high gate voltage, and a second electrode connected to the carry output node; and a first capacitor including a first electrode connected to the third control node and a second electrode connected to the bias output node.

10. The display device of claim 9, wherein the each of the stages further comprises a ninth switching element including a gate electrode receiving the high gate voltage, a first electrode connected to the first control node, and a second electrode connected to the second control node.

11. The display device of claim 10, wherein the first switching element, the second switching element, the fourth switching element, the fifth switching element, the sixth switching element, the seventh switching element, and the eighth switching element are P-type Metal-Oxide-Semiconductor (PMOS) transistors, and the third switching element and the ninth switching element are N-type Metal-Oxide-Semiconductor (NMOS) transistors.

12. The display device of claim 9, wherein the each of the stages further comprises a second capacitor including a first electrode receiving the high gate voltage and a second electrode connected to the inversion control node.

13. The display device of claim 1, wherein the first transistor includes a gate electrode connected to a first node, a first electrode connected to a second node, a second electrode connected to a third node, and the back gate electrode receiving the bias voltage, and the light emitting element includes an anode connected to a fourth node and a cathode receiving the second power supply voltage, and wherein the pixel further comprises:

a second transistor including a gate electrode receiving a data write gate signal, a first electrode connected to a data line transmitting the data voltage, and a second electrode connected to the second node;

a third transistor including a gate electrode receiving a compensation gate signal, a first electrode connected to the first node, and a second electrode connected to the third node; and a fourth transistor including a gate electrode receiving an initialization gate signal, a first electrode receiving an initialization voltage, and a second electrode connected to the first node.

14. The display device of claim 13, wherein the pixel further comprises:

a fifth transistor including a gate electrode receiving an emission signal, a first electrode receiving the first power supply voltage, and a second electrode connected to the second node; and a sixth transistor including a gate electrode receiving the emission signal, a first electrode connected to the third node, and a second electrode connected to a fourth node.

15. The display device of claim 14, wherein the pixel further comprises a seventh transistor including a gate electrode receiving an anode initialization gate signal, a first electrode receiving an anode initialization voltage, and a second electrode connected to the fourth node.

16. The display device of claim 1, wherein the first transistor includes a gate electrode connected to a first node, a first electrode receiving the first power supply voltage, a second electrode connected to a second node, and the back gate electrode receiving the bias voltage, and the light emitting element includes an anode connected to a fourth node and a cathode receiving the second power supply voltage, and wherein the pixel further comprises:

a second transistor including a gate electrode receiving a data write gate signal, a first electrode connected to a data line transmitting the data voltage, and a second electrode connected to a third node;

a third transistor including a gate electrode receiving a compensation gate signal, a first electrode connected to the first node, and a second electrode connected to the second node; and a fourth transistor including a gate electrode receiving an initialization gate signal, a first electrode receiving an initialization voltage, and a second electrode connected to the third node.

17. The display device of claim 16, wherein the pixel further comprises:

a fifth transistor including a gate electrode receiving the compensation gate signal, a first electrode receiving the first power supply voltage, and a second electrode connected to the third node; and a sixth transistor including a gate electrode receiving an emission signal, a first electrode connected to the second node, and a second electrode connected to a fourth node.

18. The display device of claim 17, wherein the pixel further comprises a seventh transistor including a gate electrode receiving an anode initialization gate signal, a first electrode receiving an anode initialization voltage, and a second electrode connected to the fourth node.

19. An electronic device, comprising:

a display panel including a pixel including a light emitting element, and a first transistor configured to generate a driving current based on a first power supply voltage and a second power supply voltage and to provide the driving current to the light emitting element;

a gate driver configured to provide a gate signal to the pixel;

a data driver configured to provide a data voltage to the pixel;

a driving controller configured to controls the gate driver and the data driver; and a processor configured to control the driving controller, wherein the first transistor includes a back gate electrode receiving a bias voltage, and wherein in an address scan period, the bias voltage is a fixed bias voltage during an address scan period and a variable bias voltage during a self-scan period after the address scan period.

20. A controller for a display device comprising a display panel including a pixel having a driving transistor with a back gate electrode, the controller comprising:

a gate driver;

a driving controller configured to determine a fixed bias voltage, determine a variable bias voltage, and control the gate driver to provide gate signals to gate lines of the display panel and a scan driving signal; and a signal generator configured to apply the fixed bias voltage to the back gate electrode during an address scan period and apply the variable bias voltage to the back gate electrode during a self-scan period following the address scan period, in synchronization with the scan driving signal.

* * * * *